United States Patent [19]
Gavrilovich

[11] Patent Number: 5,771,229
[45] Date of Patent: Jun. 23, 1998

[54] METHOD, SYSTEM AND MOBILE COMMUNICATION UNIT FOR COMMUNICATING OVER MULTIPLE CHANNELS IN A WIRELESS COMMUNICATION SYSTEM

[75] Inventor: Charles D. Gavrilovich, Naperville, Ill.

[73] Assignee: Motorola, Inc., Schaumburg, Ill.

[21] Appl. No.: 792,557

[22] Filed: Jan. 31, 1997

[51] Int. Cl.$^6$ ........................................ H04B 7/00
[52] U.S. Cl. ...................... 370/342; 370/536; 375/260; 455/59
[58] Field of Search ............................ 370/335, 342, 370/468, 536; 455/59, 445, 450, 517; 375/200, 260

[56] References Cited

U.S. PATENT DOCUMENTS

| | | | |
|---|---|---|---|
| 4,494,238 | 1/1985 | Groth, Jr. | 375/200 |
| 5,187,711 | 2/1993 | Hodohava | 455/59 |
| 5,231,649 | 7/1993 | Duncanson | 375/260 |
| 5,274,836 | 12/1993 | Lux | 375/260 |
| 5,471,497 | 11/1995 | Zehavi | 375/261 |
| 5,583,851 | 12/1996 | Kato et al. | 370/468 |

*Primary Examiner*—Benedict V. Safourek
*Attorney, Agent, or Firm*—Heather L. Creps

[57] ABSTRACT

The system operates in a wireless communication system (200) which has a plurality of wireless communication channels (501, 502) controlled by a switching center (212) and the system includes an intelligent peripheral (30) in communication with the switching center (212) and an inverse multiplexer (38) responsive to the intelligent peripheral (30). The inverse multiplexer (38) separates a broadband communication signal (100) into a plurality of portions (301, 302) and the intelligent peripheral (30) causes the switching center (212) to transmit a first portion (301) of the broadband communication signal (100) over a first wireless communication channel (501) and to transmit a second portion of the broadband communication signal (302) over a second wireless communication channel (502). The switching center (212) controls the first wireless communication channel (501) independently of the second wireless communication channel (502).

14 Claims, 2 Drawing Sheets

METHOD, SYSTEM AND MOBILE COMMUNICATION UNIT FOR COMMUNICATING OVER MULTIPLE CHANNELS IN A WIRELESS COMMUNICATION SYSTEM

FIELD OF THE INVENTION

This invention relates generally to wireless communication systems, and, more particularly, to a method, system and mobile communication unit for communicating over multiple channels in a wireless communication system.

BACKGROUND OF THE INVENTION

In a typical wireless communication system such as a cellular radio frequency (RF) radiotelephone system, a base station having a controller and a plurality of transmitters and receivers communicates with a switching center and with a mobile communication unit, or mobile station, operating within an area served by the base station.

Multiple access wireless communication between the base station and the mobile station occurs via RF channels which provide paths over which communication signals such as voice, data and video are transmitted.

Well-known RF channelization techniques include frequency division multiple access (FDMA), time division multiple access (TDMA) and code division multiple access (CDMA). A communication system using CDMA channelization is described in detail in TIA/EIA Interim Standard IS-95A, Mobile Station-Base Station Compatibility Standard for Dual-Mode Wideband Spread Spectrum Cellular System, Telecommunications Industry Association, Washington, D.C. July 1993 [IS-95A]; "TIA Telecommunications Systems Bulletin: Support for 14.4 kbps Data Rate and PCS Interaction for Wideband Spread Spectrum Cellular Systems", February 1996 [the Bulletin]; and in TIA/EIA Interim Standard IS-96 [IS-96], IS-95A, the Bulletin and IS-96 incorporated herein by reference. Another communicaiton using CDMA channelization is described in TIA/EIA Interim Standard IS-99, Data Services Option Standard for Wideband Spread Spectrum Digital Cellular System, Telecommunications Industry Association, Washington, D.C., also incorporated herein by reference.

Typically, all users of a CDMA system such as IS-95A transmit and receive communication signals over a common frequency spectrum, and specialized codes, such as Walsh codes, are used for separating multiple communication signals from one another in the system. Each specialized code typically represents one communication channel within the common frequency spectrum.

IS-95A provides a maximum baseband data rate of 9600 bits per second for a communication signal on a particular channel. It has been proposed in the art, however, to allow for variable rate signal transmission in a spread spectrum communication system. For example, U.S. Pat. No. 5,471,497 to Zehavi [Zehavi] describes, among other things, an apparatus and method for communication of information at data rates higher than 9600 bits per second over communication channels in a CDMA system. And U.S. Pat. No. 5,583,851 to Kato et al. [Kato] discloses a mobile communication system capable of transmitting information at a high bit rate by allocating a number of channels to a particular communication signal.

According to Zehavi, a high data rate communication signal is divided into a number of information substreams. Channels are assigned to individual information substreams according to an algorithm which associates a particular coset code and Walsh code to a particular information substream. Estimates of the original information substreams are obtained by a receiver which performs correlations based on the coset codes and Walsh codes used to encode the information substreams.

Kato suggests separating a high data rate communication signal into a number of information substreams and allocating a number of spreading codes, or channels, within the same cell to a particular user.

These well-known methods and apparatuses for channel assignment for a high data rate communication generally require a number of channels at a particular base station to be available simultaneously. Often, however, one or more channels which may be needed for assignment to a high data rate communication may already be in use by the communication system. This problem may be exacerbated during handoff, when at least two base stations generally must assign multiple channels to the same communication signal.

The foregoing methods also suffer from additional problems. For example, implementation of a channel assignment algorithm may require the addition of specific signaling or messaging protocols to an air interface of a wireless communication system, and may also involve the modification of costly infrastructure equipment such as base station or mobile station transceivers within the communication system.

There is therefore a need for a method, system and mobile communication unit for communicating over multiple channels in a wireless communication system which may be ubiquitously utilized by a wireless communication system.

SUMMARY OF THE INVENTION

According to an aspect of the present invention, the foregoing needs are addressed by a method for communicating over a plurality of wireless communication channels which operates in a wireless communication system. The wireless communication system is responsive to a mobile communication unit and in communication with an intelligent peripheral and the intelligent peripheral is responsive to an inverse multiplexer. The method includes receiving a message from the mobile communication unit; based on the message, forwarding to the mobile communication unit a list of access numbers, the list comprising a first access number and a second access number; in response to the forwarded list, receiving a first portion of a broadband communication signal over a first wireless communication channel established via the first access number; in response to the forwarded list, receiving a second portion of the broadband communication signal over a second wireless communication channel established via the second access number, the first wireless communication channel and the second wireless communication channel controlled independently by the wireless communication system; and combining, by the inverse multiplexer, the first portion of the broadband communication signal and the second portion of the communication signal.

According to another aspect of the present invention, a method for communicating over a plurality of wireless communication channels operates in a wireless communication system. The wireless communication system is responsive to a mobile communication unit and is in communication with an intelligent peripheral and the intelligent peripheral is responsive to an inverse multiplexer. The method includes separating, by the inverse multiplexer, a broadband communication signal into a plurality of portions;

determining a list of access numbers associated with the mobile communication unit, the list of access numbers comprising a first access number and a second access number; instructing the wireless communication system to transmit a first portion of the broadband communication signal over a first wireless communication channel, the first wireless communication channel established via the first access number; and instructing the wireless communication system to transmit a second portion of the broadband communication signal over a second wireless communication channel, the second wireless communication channel established via the second access number, the first wireless communication channel and the second wireless communication channel controlled independently by the wireless communication system.

According to yet another aspect of the present invention, a method for communicating over a plurality of wireless communication channels in a wireless communication system operates in a mobile communication unit. The mobile communication unit includes a plurality of radio frequency transmitters, a plurality of radio frequency receivers and an inverse multiplexer. The inverse multiplexer is responsive to the plurality of radio frequency transmitters and responsive to the plurality of radio frequency receivers. The method includes separating, by the inverse multiplexer, a broadband communication signal into a plurality of portions; receiving from the wireless communication system a list of access numbers, the list comprising a first access number and a second access number; after receiving the list, dialing the first access number and the second access number to establish a first wireless communication channel and a second wireless communication channel, respectively; after dialing the first access number, transmitting a first portion of the communication signal over the first wireless communication channel; and after dialing the second access number, transmitting a second portion of the communication signal over the second wireless communication channel, the first wireless communication channel controlled independently of the second wireless communication channel by the wireless communication system.

According to a further aspect of the present invention, a method for communicating over a plurality of wireless communication channels in a wireless communication system operates in a mobile communication unit having a plurality of radio frequency transmitters, a plurality of radio frequency receivers and an inverse multiplexer responsive to the plurality of radio frequency transmitters and responsive to the plurality of radio frequency receivers. The method includes transmitting to the wireless communication system a list of access numbers associated with the wireless communication unit, the list comprising a first access number and a second access number; in response to the forwarded list, receiving a first portion of a broadband communication signal over a first wireless communication channel established via the first access number; and in response to the forwarded list, receiving a second portion of the broadband communication signal over a second wireless communication channel established via the second access number, the first wireless communication channel and the second wireless communication channel controlled independently by the wireless communication system.

According to a still futher aspect of the present invention, a system operates in a wireless communication system having a plurality of wireless communication channels controlled by a switching center and a system for communicating over at least some of the wireless communication channels. The system includes an intelligent peripheral in communication with the switching center and an inverse multiplexer responsive to the intelligent peripheral. The inverse multiplexer separates a broadband communication signal into a plurality of portions and the intelligent peripheral causes the switching center to transmit a first portion of the broadband communication signal over a first wireless communication channel and to transmit a second portion of the broadband communication signal over a second wireless communication channel. The switching center controls the first wireless communication channel independently of the second wireless communication channel.

According to another aspect of the present invention, a mobile communication unit for use in a wireless communication system having a plurality of wireless communication channels controlled by a switching center, an intelligent peripheral in communication with the switching center and an inverse multiplexer responsive to the intelligent peripheral includes a plurality of spread spectrum transmitters, a plurality of spread spectrum receivers and an inverse multiplexer responsive to the plurality of spread spectrum transmitters and responsive to the plurality of spread spectrum receivers. The inverse multiplexer separates a broadband communication signal into a first portion and a second portion and transmits the first portion over a first wireless communication channel and transmits the second portion over a second wireless communication channel. The first wireless communication channel is controlled by the wireless communication system independently of the second wireless communication channel.

Advantages of the present invention will become readily apparent to those skilled in the art from the following description of the preferred embodiment(s) of the invention which have been shown and described by way of illustration. As will be realized, the invention is capable of other and different embodiments, and its details are capable of modifications in various respects. Accordingly, the drawings and description are to be regarded as illustrative in nature, and not as restrictive.

DETAILED DESCRIPTION OF THE PREFERRED EMBODIMENTS

Figure 1:
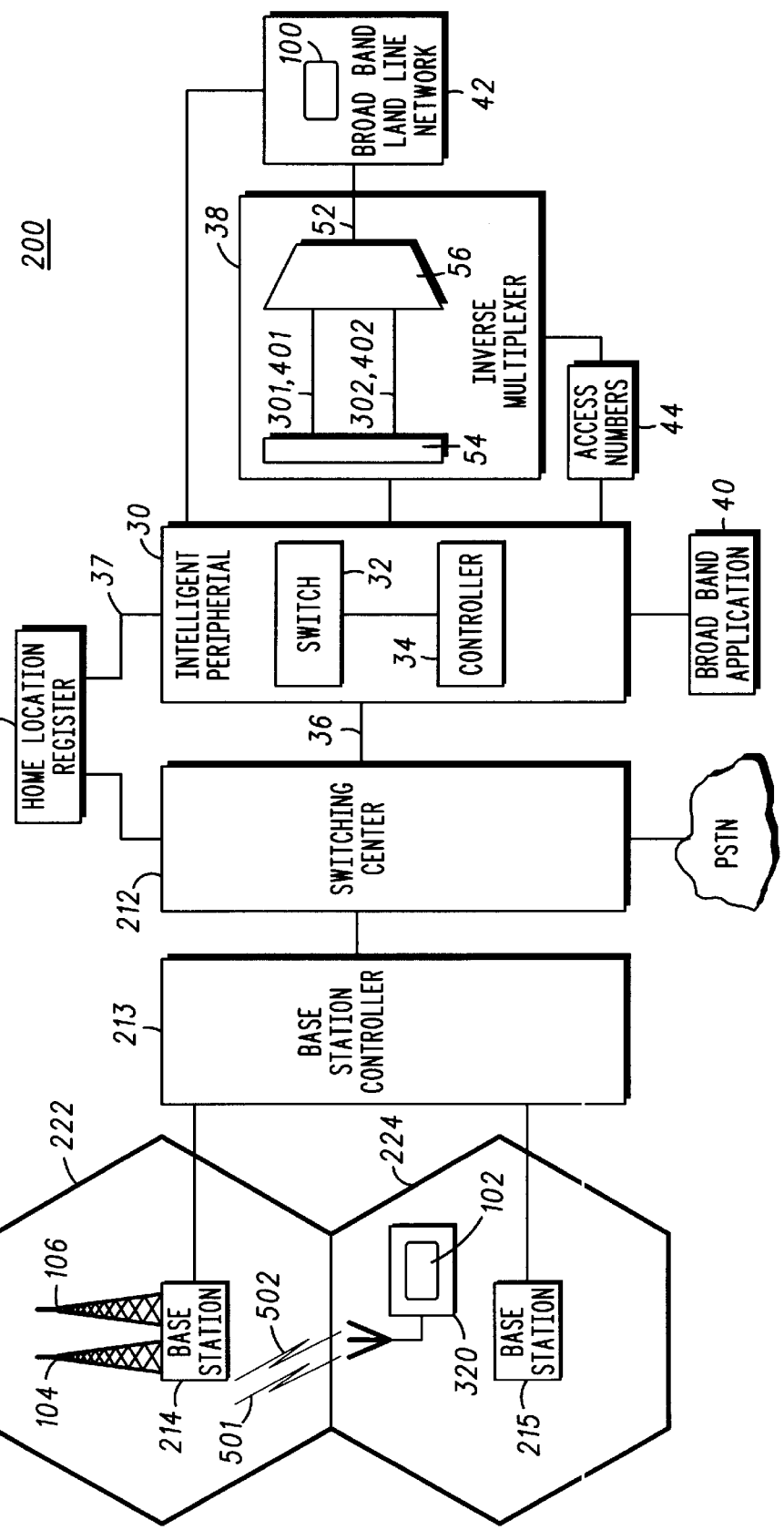
FIG. 1 is a block diagram of a wireless communication system according to a preferred embodiment of the present invention.

Turning now to the drawings, wherein like numerals designate like components, FIG. 1 is a block diagram of a wireless communication system 200 for communicating over a plurality of wireless communication channels, according to a preferred embodiment of the present invention. A switching center 212, which may be a mobile switching center such as an EMX™ 2500, commercially available from Motorola, Inc., Ill., or another suitable type of switching center, is in communication with, among other things, a base station controller 213 and public switched telephone network (PSTN) 221.

Base station controller 213 may include at least one processor (not shown) and one or more memories (not shown), and also includes an interworking function (not shown). Base station controller 213 is in turn in communication with two base stations 214 and 215, each of which may include a plurality of transceivers, such as transceivers 104 and 106 associated with base station 214, along with one or more processors (not shown) and one or more memories (not shown). Additional base station controllers may be coupled to switching center 212. Likewise, additional base stations may be coupled to base station controller 213.

Home location register (HLR) 216 is in communication with both switching center 212 and intelligent peripheral 30. Home location registers are commercially available from Motorola, Inc.

Intelligent peripheral 30, such as a Motorola Service Node, available from Motorola, Inc. in Arlington Heights, Ill., preferably includes a programmable switch 32, such switches being well-known and widely available, and a controller 34, such as a general-purpose computer.

As shown, service node 30 and switching center 212 are coupled by a wireline connection 36, which may be a dedicated trunk group. Suitable signaling protocols for communication over wireline connection 36 include, but are not limited to, multi-frequency (MF) signaling, C7 signaling, system signaling 7 (SS7) and European and analog digital trunk signaling systems such as embodied in the R2 series of specifications. Alternatively, a data link 37, which may utilize IS-41 signaling protocol, may couple service node 30 and home location register 216.

Service node 30 is responsive to broadband application 40, which may be a multimedia software application such as videoconferencing, for example; to an inverse multiplexer 38; to a broadband landline network 42 such as an integrated services digital network (ISDN) or to another type of broadband network; and to a list of access numbers 44. Access number list 44 preferably includes a list of codes, such as wireline phone numbers or internet address numbers, associated with a particular network element such as service node 30. It is contemplated, however, that access number list 44 may be responsive to another network element such as inverse multiplexer 38 or HLR 216.

Inverse multiplexer 38 includes an application interface 52, an inverse multiplexing engine 56 responsive to interface 52 and a network interface 54 responsive to inverse multiplexing engine 56.

Application interface 52 responds to indications and signaling from broadband application 40 and/or broadband landline network 42. One function of application interface 52 is to accept a high data rate, or broadband, communication signal, such as communication signal 100, from broadband landline network 42.

Inverse multiplexing engine 56 functions to separate broadband communication signal 100 into a number of portions, or data streams 301, 302, and to process and present individual portions 301, 302 to network interface 54. Inverse multiplexing engine 56 performs error detection and synchronization procedures as required, using well-known methods and techniques.

Network interface 54 is responsive to service node 30, and preferably utilizes, according to well-known methods, the signaling mechanism appropriate for the type of connection (discussed above) between service node 30 and communication system 200. One function of network interface 54 is to cause individual portions 301, 302 of communication signal 100 to be transmitted across separate, independent wireless traffic channels of a wireless communication system, such as system 200, and to be set up as standard data calls. This function may be accomplished according to well-known methods and signaling techniques used for communicating with service node 30 and/or for establishing and removing channels across system 200 (discussed further below).

Another function of network interface 54 is to process individual portions 401, 402 of a high data rate communication signal 102 (discussed further below), which have been transmitted by a mobile communication unit 320 (also discussed further below) via separate, independent traffic channels standard data calls of a wireless communication system, such as channels 501 and 502, and which have been received by base station 214 or 215. In this case, then, inverse multiplexing engine 56 functions to recombine individual portions 401, 402 into substantially the originally transmitted communication signal 102. The reconstructed signal may be further be processed by application interface 52 before being transmitted to broadband landline network 42.

Inverse multiplexer 38 may be implemented as an application specific integrated circuit, or may be implemented in a digital signal processor, and is preferably a commercially available device, suitable devices being available from a variety of sources, including Ascend Communications, Inc. and Larscom, Inc. A detailed description of inverse multiplexers is provided in U.S. Pat. No. 5,231,649 to Duncanson, incorporated herein by reference, and in "Inverse Multiplexing: Getting Started on the Road to ATM", by Jeff Reedy, Telecommunications, July 1995, also incorporated herein by reference.

Mobile station 320, which may operate in areas 222 and 224, served by base stations 214 and 215, respectively, is designed to communicate with base stations 214 and 215. Multiple access wireless communication between base stations 214 and 215 and mobile station 320 preferably occurs over radio frequency (RF) channels, such as channels 501 and 502, which provide physical paths over which analog or digital communication signals such as voice, data and video are transmitted. Base-to-mobile station communications are said to occur on a forward-link channel, while mobile-to-base station communications are referred to as being on a reverse-link channel. A communication system using digital channelization which is suitable for use with the various embodiments of the present invention is described in detail in IS-95A.

Figure 2:
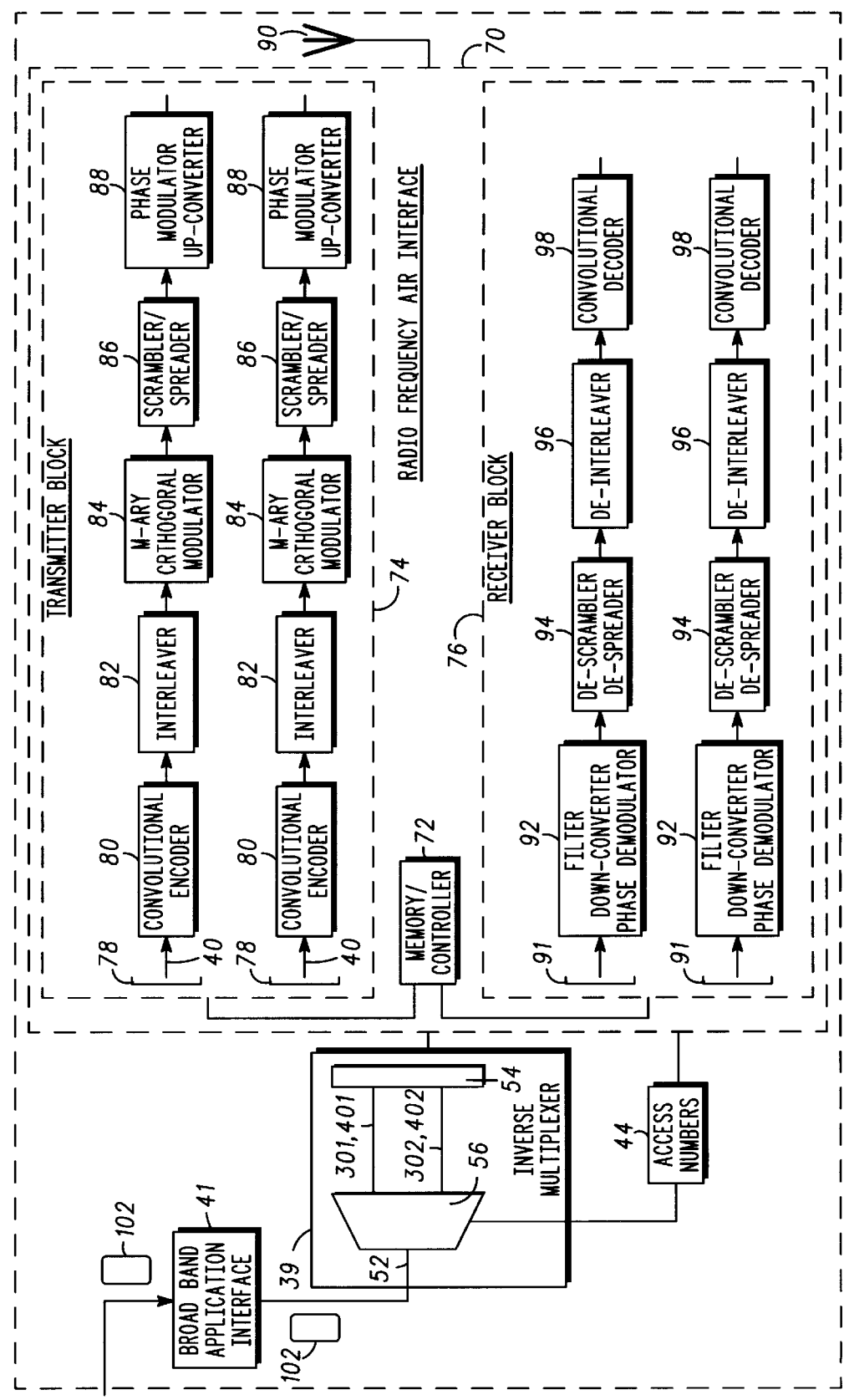
FIG. 2 is a block diagram of the mobile communication unit shown in FIG. 1, according to a preferred embodiment of the present invention.

FIG. 2 is a block diagram of mobile communication unit 320, according to a preferred embodiment of the present invention. As shown, mobile communication unit 320 includes a radio frequency air interface portion 70, an inverse multiplexer 39, a broadband application interface portion 40 and a list of access numbers 44.

Radio frequency air interface portion 70 is responsive to inverse multiplexer 39 (discussed further below) and list 44, and includes a memory and controller block 72, a transmitter block 74 and a receiver block 76. Memory and controller block 72, which preferably includes one or more memories and one or more processors, is in communication with transmitter block 74 and receiver block 76.

Transmitter block 74 includes a number of transmitters 78 (two shown) such as those used by a CDMA mobile station for producing an IS-95A-compatible reverse-channel waveform for transmission to an IS-95A base station, such as base station 214 or 215. Using known methods, convolutional encoder block 80 encodes a data stream 40, having a data rate supported by IS-95A, at a fixed encoding rate using algorithms which facilitate subsequent decoding of data stream 40. Interleaver 82 organizes data stream 40 into frames of a predetermined size, according to conventional methods. Reference bits may be inserted periodically within the interleaved data stream to further facilitate decoding of data stream 40.

Next, M-ary orthogonal modulator block 84 modulates data symbols output from interleaver 82 with orthogonal codes, such as Walsh codes, according to conventional methods.

At scrambler/spreader block 86, the modulated data symbols are scrambled by a pseudorandom noise (PN) sequence according to well-known scrambling techniques. It is contemplated that the same PN sequence may be assigned to all transmitters 78. The sequence may be shifted with respect to itself by a few chips and the shifted versions of the code assigned to the individual transmitters for spreading. The very low auto-correlation of the spreading code when shifted may result in a minimum interference between transmitted signals. Alternatively, separate PN codes having low cross-correlation may be assigned to each channel consistent with a standard air interface such as IS-95A.

Phase modulator up-converter block 88 operates on the modulated, scrambled data symbols by summing, upsampling, transmit filtering, upbanding causing them to be broadcast over wireless communication channels, such as channels 501 and 502, via antenna 90. If all transmitters 78 are synchronized with substantially exact chip alignment and transmit at the same power level, interference may be further reduced since the transmitted signals will traverse substantially the same path and arrive at their destinations substantially synchronized and having similar power levels. This facilitates signal detection and increases overall system capacity.

Receiver block 76 includes a number of receivers 91 (two shown), such as those used by a CDMA mobile station for receiving an IS-95A-compatible forward-channel communication signal from an IS-95A base station, such as base station 214 or 215. After being received by antenna 90 and passing through filter/down-converter/phase demodulator block 92, the received communication signal is descrambled and despread by conventional methods at descrambler/despreader block 94. Block 94, among other things, removes a Walsh function used to provide orthogonal channelization on a given forward CDMA channel. To recover the originally transmitted data stream, the communication signal is deinterleaved at block 96 and decoded at convolutional decoder block 98, according to conventional methods.

Transmitter block 74 and receiver block 76 may be implemented, for example, in the same manner which is commonly employed for IS-95A-compatible cellular radiotelephones.

Access number list 44 preferably includes a list of codes, such as phone numbers, electronic serial numbers or mobile identification numbers, associated with each transmitter 78 or receiver 91.

Inverse multiplexer 39, which is responsive to radio frequency air interface portion 70, broadband application interface 41 and list 44, is preferably similar in structure and function to inverse multiplexer 38 shown in, and discussed in connection with, FIG. 1. As such, inverse multiplexer 39 may include an application interface 52, an inverse multiplexing engine 56 responsive to interface 52 and a network interface 54 responsive to inverse multiplexing engine 56.

Application interface 52 responds to indications and signaling from broadband application interface 41. One function of broadband application interface 41, which is in turn the function of application interface 52, is to accept a high data rate, or broadband, communication signal, such as communication signal 102, from a broadband application such as a multimedia application (not shown).

Inverse multiplexing engine 56 functions to separate broadband communication signal 102 into a number of portions, or data streams, 401 and 402, and to process and present individual portions 401, 402 to network interface 54. Inverse multiplexing engine 56 performs error detection and synchronization procedures as required, using well-known methods and techniques.

Network interface 54 is responsive to radio frequency air interface 70, and preferably interacts with interface 70 via well-known signaling and messaging protocols provided for communication with IS-95A-compatible cellular radiotelephones. One function of network interface 54 is to cause individual portions 401, 402 of communication signal 102 to be processed by separate, independent transmitters 78. Thus, portion 401 will be transmitted by wireless communication system 200 over a separate, independent wireless traffic channel from the traffic channel over which portion 402 is transmitted.

Another function of network interface 54 is to receive and process individual portions 301, 302 of high data rate communication signal 100, which have been transmitted by base stations 214 and/or 215 via separate, independent traffic channels of wireless communication system 200, and which have been received by independent receivers 91.

Inverse multiplexing engine 56 functions to recombine individual portions 301, 302 into substantially the originally transmitted communication signal 102. The reconstructed signal may be further be processed by application interface 52 before being transmitted to broadband application interface 41.

Communication over a number of wireless communication channels, such as channels 501 and 502, within wireless communication system 200 may be initiated when a set-up message is transmitted by mobile station 320 to base station 214 or 215. The set-up message may be, for example, a request from mobile station 320 to originate a wireless communication, or may be an acknowledgment that mobile station 320 is available to receive a wireless communication originated elsewhere. It is assumed, for purposes of discussion, that mobile station 320 desires to transmit and/or receive a broadband communication signal, such as signal 100 or 102, which has a data rate higher than 9600 bits per second.

If the set-up message is a request from mobile station 320 to originate a wireless communication, mobile station 320 dials an access number, or phone number, which routes the set-up message to service node 30, and/or inverse multiplexer 38. If the set-up message is an acknowledgment that mobile station 320 is available to receive a wireless communication originated by broadband landline network 42, for example, service node 30 or another network element may cause base station 214 or 215 to dial an access number associated with mobile station 320. Thus, an initial narrowband channel (having a baseband data rate of up to 9600 bits per second in IS-95A) is established, as well as a communication link between inverse multiplexer 39 within mobile station 320 and inverse multiplexer 38, which is responsive to service node 30.

Next, inverse multiplexers 38 and 39 determine how many additional independent wireless narrowband communication channels should be established through wireless communication system 200 in order to supply sufficient bandwidth for the broadband communication. For example, inverse multiplexers 38 and 39 may negotiate a number of channels to be used, such as two channels 501 and 502, and separate the communication signal into two portions such as portions 401 and 402 or 301 and 302. It is contemplated, however, that additional, or spare, channels may be established during call set-up, to be used, for example, as replacements for failed channels.

Inverse multiplexer 39 preferably communicates with inverse multiplexer 38 via a protocol such as the Bandwidth On Demand Interoperablility Group (BONDING) protocol, published by ITU-TSS in document H.221 as a videoconferencing support protocol, which provides for interoperability between inverse multiplexers.

To establish each individual, independent, wireless communication channel 501, 502, inverse multiplexer 38 may request from service node 30, or alternatively from HLR 216, access number list 44 associated with mobile station 320. Inverse multiplexer may then instruct switching center 212 to establish wireless communication channels 501 and 502 via those numbers. The channels may be established in parallel, i.e., substantially simultaneously, or serially, i.e., one after the other. Alternatively, inverse multiplexer 38 may transmit to inverse multiplexer 39 access number list 44 associated with service node 30, so that mobile station 320 may use the access numbers on that list to establish wireless communication channels 501 and 502 to service node 30, by dialing the access numbers, for example. Channels 501 and 502 may be established in parallel or serially. It is contemplated that channels 501 and 502 may be established on one carrier or on different carriers.

Inverse multiplexer 38 or 39, or both inverse multiplexer 38 and 39, may monitor the integrity of the broadband communication signal and take appropriate actions if transmission problems occur. For example, if a wireless communication channel, such as channel 501 or 502, is lost during a handoff, or is compromised for any other reason, multiplexers 38, 39 may reduce the broadband rate and initiate reestablishment of the lost communication channel over another channel(s), without terminating the broadband connection. If, for some applications, reduction of the broadband rate is not desirable or possible, additional channels may be established. Thus, dynamic allocation of bandwidth is possible.

Systems, methods and mobile communication units have been described herein, in which a broadband communication signal may be transmitted or received over a plurality of wireless communication channels in a wireless communication system in a manner which is invisible to the wireless communication system's infrastructure. For example, referring to FIGS. 1 and 2, mobile station 320 appears to base station 214 as multiple independent narrowband mobile stations such as IS-95A-compatible cellular radiotelephones. Thus, as mobile station 320 moves from area 222 served by base station 214 toward area 224 served by base station 215, handoffs of communication signals 401 and 402 (or 301 and 302), transmitted via wireless channels 501 and 502, will be performed independently.

In addition, the above-described systems and methods do not require a number of channels at a particular base station or carrier to be available simultaneously. The independent narrowband channels may be on different carriers, or on the same carrier, allowing better utilization of available resources and reducing blocking probablility. Any idle channel may be assigned to a particular portion of a broadband communication. This feature may be especially important during handoff.

Further, the systems and methods described herein do not require modification of air interface protocols or of RF infrastructure equipment to allow the ubiquitous transmission of broadband communication signals.

CDMA cellular communication systems have been referred to herein, but the present invention is applicable to any communication system, including but not limited to analog communication systems such as Total Access Communication System (TACS), and other digital communication systems such as Groupe Special Mobile (GSM), a European time division multiple access (TDMA) system, Pacific Digital Cellular (PDC), a Japanese TDMA system, Interim Standard 54 (IS-54), a U.S. TDMA system and Interim Standard 96 (IS-96), a code division multiple access system.

The principles of the present invention which apply to cellular-based communication systems may also apply to other types of communication systems, including but not limited to personal communication systems, which may provide for a maximum baseband data rate of 14,400 bits per second for circuit switched data, and satellite communication systems. Likewise, the principles of the present invention which apply to all types of radio frequency channels also apply to other types of wireless communication channels.

It will be apparent that other and further forms of the invention may be devised without departing from the spirit and scope of the appended claims and their equivalents. It will also be understood that this invention is not to be limited in any manner to the specific embodiments described above, but will only be governed by the following claims and their equivalents.

I claim:

1. In a wireless communication system responsive to a mobile communication unit and in communication with an intelligent peripheral, the intelligent peripheral responsive to an inverse multiplexer, a method for communicating over a plurality of wireless communication channels, the method comprising the steps of:

receiving a message from the mobile communication unit;

based on the message, forwarding to the mobile communication unit a list of access codes, the list comprising a first access code and a second access code;

in response to the forwarded list, receiving a first portion of a broadband communication signal over a first wireless communication channel established via the first access code;

in response to the forwarded list, receiving a second portion of the broadband communication signal over a second wireless communication channel established via the second access code, the first wireless communication channel and the second wireless communication channel controlled independently by the wireless communication system; and combining, by the inverse multiplexer, the first portion of the broadband communication signal and the second portion of the communication signal.

2. The method according to claim 1, wherein the broadband communication signal comprises a multimedia signal.

3. The method according to claim 1, wherein the list of access codes comprises a list of phone numbers associated with the intelligent peripheral.

4. The method according to claim 1, wherein the intelligent peripheral comprises a service node.

5. The method according to claim 1, wherein the list of access codes comprises a list of phone numbers associated with the inverse multiplexer.

6. The method according to claim 1, further comprising the step of:

after the step of forwarding, dialing, by the mobile communication unit, the first access code.

7. The method according to claim 1, wherein the first wireless communication channel comprises a spread spectrum communication channel.

8. The method according to claim 7, wherein the spread spectrum communication channel comprises a narrowband channel.

9. The method according to claim 1, wherein the wireless communication system comprises a code division multiple access communication system.

10. In a wireless communication system responsive to a mobile communication unit and in communication with an intelligent peripheral, the intelligent peripheral responsive to an inverse multiplexer, a method for communicating over a plurality of wireless communication channels, the method comprising the steps of:

separating, by the inverse multiplexer, a broadband communication signal into a plurality of portions;

determining a list of access codes associated with the mobile communication unit, the list of access codes comprising a first access code and a second access code;

instructing the wireless communication system to transmit a first portion of the broadband communication signal over a first wireless communication channel, the first wireless communication channel established via the first access code; and instructing the wireless communication system to transmit a second portion of the broadband communication signal over a second wireless communication channel, the second wireless communication channel established via the second access code, the first wireless communication channel and the second wireless communication channel controlled independently by the wireless communication system.

11. In a mobile communication unit comprising a plurality of radio frequency transmitters, a plurality of radio frequency receivers and an inverse multiplexer, the inverse multiplexer responsive to the plurality of radio frequency transmitters and responsive to the plurality of radio frequency receivers, a method for communicating over a plurality of wireless communication channels in a wireless communication system, the method comprising the steps of:

separating, by the inverse multiplexer, a broadband communication signal into a plurality of portions;

receiving from the wireless communication system a list of access codes, the list comprising a first access code and a second access code;

after receiving the list, dialing the first access code and the second access code to establish a first wireless communication channel and a second wireless communication channel, respectively;

after dialing the first access code, transmitting a first portion of the communication signal over the first wireless communication channel; and after dialing the second access code, transmitting a second portion of the communication signal over the second wireless communication channel, the first wireless communication channel controlled independently of the second wireless communication channel by the wireless communication system.

12. In a mobile communication unit comprising a plurality of radio frequency transmitters, a plurality of radio frequency receivers and an inverse multiplexer responsive to the plurality of radio frequency transmitters and responsive to the plurality of radio frequency receivers, a method for communicating over a plurality of wireless communication channels in the wireless communication system, the method comprising the steps of:

transmitting to the wireless communication system a list of access codes associated with the wireless communication unit, the list comprising a first access code and a second access code;

in response to the forwarded list, receiving a first portion of a broadband communication signal over a first wireless communication channel established via the first access code; and in response to the forwarded list, receiving a second portion of the broadband communication signal over a second wireless communication channel established via the second access code, the first wireless communication channel and the second wireless communication channel controlled independently by the wireless communication system.

13. In a wireless communication system having a plurality of wireless communication channels controlled by a switching center, a system for communicating over at least some of the wireless communication channels, the system comprising:

an intelligent peripheral in communication with the switching center; and an inverse multiplexer responsive to the intelligent peripheral, the inverse multiplexer separating a broadband communication signal into a plurality of portions and the intelligent peripheral causing the switching center to transmit a first portion of the broadband communication signal over a first wireless communication channel and to transmit a second portion of the broadband communication signal over a second wireless communication channel, the switching center controlling the first wireless communication channel independently of the second wireless communication channel.

14. A mobile communication unit for use in a wireless communication system having a plurality of wireless communication channels controlled by a switching center, an intelligent peripheral in communication with the switching center and an inverse multiplexer responsive to the intelligent peripheral, the mobile communication unit comprising:

a plurality of spread spectrum transmitters;

a plurality of spread spectrum receivers; and an inverse multiplexer responsive to the plurality of spread spectrum transmitters and responsive to the plurality of spread spectrum receivers, wherein the inverse multiplexer separates a broadband communication signal into a first portion and a second portion and transmits the first portion over a first wireless communication channel and transmits the second portion over a second wireless communication channel, the first wireless communication channel controlled by the wireless communication system independently of the second wireless communication channel.

* * * * *